No. 665,174. Patented Jan. 1, 1901.
T. E. CARPENTER.
UNIVERSAL JOINT.
(Application filed May 14, 1900.)

(No Model.)

WITNESSES.
Charles T. Hannigan.
Annie E. Pirce.

INVENTOR.
Thomas E. Carpenter
By Warren R. Pirce
Atty.

UNITED STATES PATENT OFFICE.

THOMAS E. CARPENTER, OF PROVIDENCE, RHODE ISLAND.

UNIVERSAL JOINT.

SPECIFICATION forming part of Letters Patent No. 665,174, dated January 1, 1901.

Application filed May 14, 1900. Serial No. 16,647. (No model.)

*To all whom it may concern:*

Be it known that I, THOMAS E. CARPENTER, a citizen of the United States, residing in the city and county of Providence, in the State of Rhode Island, have invented a certain new and useful Improvement in Universal Joints; and I declare the following to be a specification thereof, reference being had to the accompanying drawings.

Like letters indicate like parts.

Figure 1:
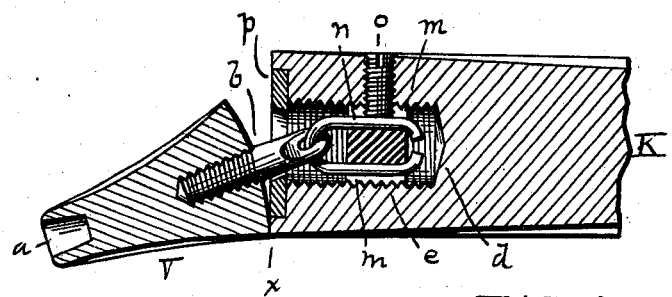
Figure 2:
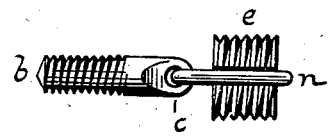

Figure 1 is a central longitudinal section of two rollers or shafts with my improved universal joint connecting the same, said joint being shown partly in side elevation and partly in central longitudinal section. Fig. 2 is a side elevation of said invention.

My invention consists of the novel construction and combination of the elements or parts hereinafter particularly described and as specifically set forth in the claims.

My improved universal joint is applicable to connect the adjacent ends of two shafts of any kind, which shafts are mounted at an angle to each other; but in Fig. 1 I show the same as used to connect the adjacent ends of a main roller and a companion conical roller, such as are used in machines for the manufacture of cigars.

The main roller is shown at K and has a concentric screw-threaded socket $d$ at the end which is adjacent to the conical roller V, and it also has an unthreaded annular socket at the outer end of the socket $d$, but of a larger diameter, as illustrated in Fig. 1. A cylindrical block $e$, having an external screw-thread thereon, fits engageably in the socket $d$ of the main roller, as shown. Said cylindrical block $e$ is externally slotted lengthwise on two opposite sides, as indicated at $m$. A wire loop $n$ embraces the cylindrical block $e$ in the slots thereof, and the ends of said loop $n$ are bent inwardly, as shown in Fig. 1, to prevent the withdrawal of the loop from the block $e$. A set-screw $o$ passes through a screw-threaded hole in one side of the main roller and has its inner end abut one arm or side of the wire loop $n$ in one of the slots $m$ thereof, said block $e$ having a screw-threaded hole through its side extending to the bottom of the slot, as seen in Fig. 1. When the screw $o$ has been set, its outer end is flush with the exterior surface of the main roller. A ring $p$, fitting in the annular recess in the end of the main roller, has its central aperture beveled, as shown.

The conical roller V has an axially-directed bore which is screw-threaded. A screw-bolt $b$ engages with the conical roller V in said bore and has its outer end beveled on opposite sides and formed into an eye $c$. The wire loop $n$ passes through the eye $c$ of the screw-bolt $b$, as shown in the drawings.

The rollers K and V are properly mounted at an angle with each other in suitable supports at their outer ends, respectively, and by their said universal-joint connection are compelled to rotate together and to maintain their angular position relatively to each other. The loop $n$, held in the cylindrical block $e$ within the bore $d$ of the main roller K and rotating with said main roller because of the engagement of the set screw $o$ with said roller and block, imparts to the eyebolt $b c$ the same rotatory movement, and so rotates the conical roller V, to which said eyebolt is fastened, thus compelling the rollers K and V to rotate together.

I claim as a novel and useful invention and desire to secure by Letters Patent—

1. In combination with two shafts or rollers, properly mounted, one of which has in its end a concentric socket and the other of which has in its end a central, screw-threaded bore, the universal joint herein described, consisting of a screw-bolt engageable with the last-named shaft or roller in the screw-threaded bore thereof and having an eye in its outer end, and a wire loop passing through said eye and secured in said socket of the first-named shaft or roller, substantially as shown.

2. In combination with two shafts or rollers, properly mounted, one of which has in its end a concentric screw-threaded socket and the other of which has in its end a central screw-threaded bore, the universal joint herein described, consisting of a screw-bolt engageable with the last-named shaft or roller in the screw-threaded bore thereof and having an eye in its outer end, a screw-threaded block engageable with the screw-threaded socket of the first-named shaft or roller and having two oppositely-arranged longitudinal grooves, and a wire loop passing through the eye of the screw-bolt and extending in and along the grooves of said block with the ends thereof bent over the inner end of said block, substantially as set forth.

3. In combination with two shafts or rollers properly mounted, one of which has in its end a concentric screw-threaded socket and the other of which has in its end a central screw-threaded bore, the universal joint herein described, consisting of a screw-bolt engageable with the last-named shaft or roller in the screw-threaded bore thereof and having an eye in its outer end, a screw-threaded block engageable with the screw-threaded socket of the first-named shaft or roller and having two oppositely-arranged longitudinal grooves, a wire loop passing through the eye of the screw-bolt and extending in and along the grooves of said block with the ends thereof bent over the inner end of said block, and a set-screw passing through the side of said first-named shaft or roller and having its inner end abutting the wire loop on one side of said block, substantially as specified.

In testimony whereof I affix my signature in presence of two witnesses.

THOMAS E. CARPENTER.

Witnesses:
 WARREN R. PERCE,
 MABEL FOSTER.